United States Patent
Zhou et al.

(10) Patent No.: US 10,812,698 B1
(45) Date of Patent: Oct. 20, 2020

(54) CAMERA ASSEMBLY AND ELECTRONIC DEVICE

(71) Applicant: BEIJING XIAOMI MOBILE SOFTWARE CO., LTD., Beijing (CN)

(72) Inventors: Kai Zhou, Beijing (CN); Hongzhi Jin, Beijing (CN); Tao Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/582,120

(22) Filed: Sep. 25, 2019

(30) Foreign Application Priority Data

Apr. 16, 2019  (CN) .......................... 2019 1 0304930

(51) Int. Cl.
| | |
|---|---|
| *H04M 1/00* | (2006.01) |
| *H04N 5/225* | (2006.01) |
| *G03B 17/56* | (2006.01) |
| *H04M 1/02* | (2006.01) |

(52) U.S. Cl.
CPC ......... *H04N 5/2257* (2013.01); *G03B 17/561* (2013.01); *H04M 1/0264* (2013.01); *H04N 5/2253* (2013.01)

(58) Field of Classification Search
CPC . H04N 5/2257; H04N 5/2253; H04M 1/0264; G03B 17/561
USPC ..................................................... 455/556.1
See application file for complete search history.

(56) References Cited

U.S. PATENT DOCUMENTS

| | | | |
|---|---|---|---|
| 7,424,214 B2* | 9/2008 | Kim | G06K 19/07732 348/14.02 |
| 7,680,404 B2* | 3/2010 | Schack | G03B 17/17 396/429 |
| 9,648,280 B2* | 5/2017 | Kim | H04N 7/15 |
| 10,021,296 B2* | 7/2018 | Fan | H04N 5/2251 |
| 10,419,589 B2* | 9/2019 | Fan | H04M 1/0264 |
| 2007/0009247 A1* | 1/2007 | Maeda | H04M 1/0237 396/72 |
| 2008/0064437 A1* | 3/2008 | Chambers | H04N 1/00307 455/556.1 |
| 2019/0173986 A1* | 6/2019 | Xu | H04M 1/0208 |

FOREIGN PATENT DOCUMENTS

EP          3396933 A1    10/2018

OTHER PUBLICATIONS

Search report for EP application 19206044.0 dated May 4, 2020.

* cited by examiner

*Primary Examiner* — April G Gonzales
(74) *Attorney, Agent, or Firm* — Syncoda LLC; Feng Ma

(57) ABSTRACT

A camera assembly includes a first driving structure, a second driving structure, a transmission and a camera module. The transmission can cooperate with the first driving structure to drive the camera module to reciprocate linearly in a preset direction, and the transmission can cooperate with the second driving structure to drive the camera module to rotate about an axis in the preset direction.

18 Claims, 7 Drawing Sheets

CAMERA ASSEMBLY AND ELECTRONIC DEVICE

CROSS-REFERENCE TO RELATED APPLICATIONS

This application claims priority to Chinese Patent Application Serial No. 201910304930.9 filed on Apr. 16, 2019, the disclosure of which is hereby incorporated by reference in its entirety.

BACKGROUND

At present, full-screen mobile phones have become an important trend in the development of the mobile phone industry. In order to increase the screen-to-body ratio of the mobile phone without affecting its image capturing function, an important direction of research has been to emphasize pop-up camera technologies.

SUMMARY

The present disclosure relates generally to the technical field of cameras, and more specifically to a camera assembly and an electronic device.

Various embodiments of the disclosure provide a camera assembly and an electronic device for overcoming defects in the related art.

According to the first aspect of embodiments of the present disclosure, there is provided a camera assembly, including: a first driving structure; a second driving structure; a camera module; and a transmission capable of cooperating with the first driving structure to drive the camera module to reciprocate linearly in a preset direction, and capable of cooperating with the second driving structure to drive the camera module to rotate about an axis in the preset direction.

According to the second aspect of embodiments of the present disclosure, there is provided another camera assembly, including: a transmission; a camera module connected with the transmission, a first driving structure connected to the transmission and drive the camera module to reciprocate linearly in a preset direction; and a second driving structure connected to the transmission and drive the camera module to rotate about an axis in the preset direction.

According to the third aspect of embodiments of the present disclosure, there is provided an electronic device, including: a device body with an opening at any side of the device body; and a camera assembly arranged in the device body, the camera module including: a transmission, a camera module connected with the transmission, a first driving structure connected to the transmission and drive the camera module to protrude or retract through the opening in a preset direction, and a second driving structure connected to the transmission and drive the camera module to rotate about an axis in the preset direction after protruding through the opening.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain the principles of various embodiments of the disclosure.

DETAILED DESCRIPTION

Figure 1:
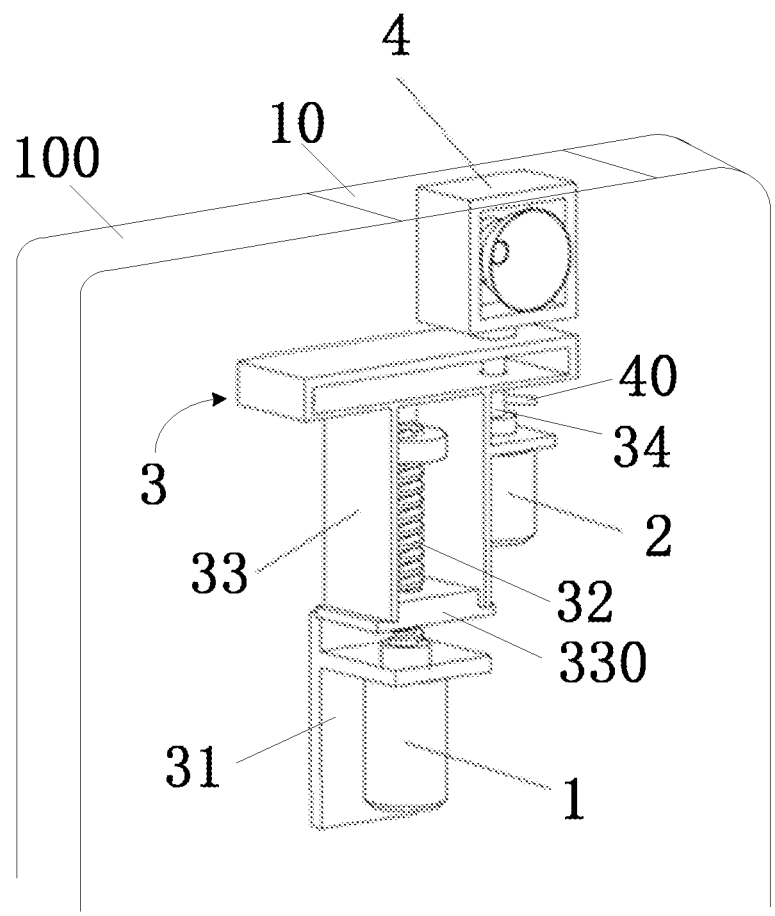
FIG. 1 is a schematic diagram of a camera assembly in a retracted state according to some embodiments.

Exemplary embodiments of the present disclosure will be described in detail and examples of the embodiments will be illustrated in the drawings. When the following description refers to the drawings, unless specified otherwise, the same numbers in different drawings represent the same or similar elements. The implementations described in the following exemplary embodiments do not represent all implementations consistent with the present disclosure, and instead they are merely examples of devices and methods consistent with aspects of the present disclosure as detailed in the appended claims.

In the present disclosure, in the absence of description to the contrary, orientation terms, such as "inner," "outer" or the like are generally in terms of a contour of the corresponding component. In addition, the terms such as "first" and "second" in embodiments of the present disclosure are used to distinguish one element from another element, and are not intended to indicate or imply any sequence or relative importance.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as first, second and third are used herein for describing various kinds of information in this disclosure, such information should not be limited to these terms. These terms are only used for distinguishing the same type of information from each other. For example, without departing from the scope of this disclosure, a first information may also be called as a second information, and similarly, the second information may also be referred to as the first information. Depending on the context, the term "if" may be construed to mean "when" or "upon" or "in response to determining".

Embodiments of the present disclosure provide a camera assembly, including: a first driving structure; a second driving structure; a camera module; and a transmission capable of cooperating with the first driving structure to drive the camera module to reciprocate linearly in a preset direction, and capable of cooperating with the second driving structure to drive the camera module to rotate about an axis in the preset direction.

Embodiments of the present disclosure provide another camera assembly, including: a transmission; a camera module connected with the transmission, a first driving structure connected to the transmission and drive the camera module to reciprocate linearly in a preset direction; and a second driving structure connected to the transmission and drive the camera module to rotate about an axis in the preset direction.

Embodiments of the present disclosure provide an electronic device, including: a device body with an opening at any side of the device body; and a camera assembly arranged in the device body, the camera module including: a transmission, a camera module connected with the transmission, a first driving structure connected to the transmission and drive the camera module to protrude or retract through the opening in a preset direction, and a second driving structure connected to the transmission and drive the camera module to rotate about an axis in the preset direction after protruding through the opening.

FIG. 1 is a schematic diagram of a camera assembly according to some embodiments.

As illustrated in FIG. 1, the camera assembly can include a first driving structure 1, a second driving structure 2, a transmission 3, and a camera module 4. The transmission 3 can cooperate with the first driving structure 1 to drive the camera module 4 to reciprocate linearly in a preset direction (such as a vertical direction in FIG. 1). The camera assembly can be arranged in an electronic device, such as a mobile phone, a tablet device, a laptop, a wearable device, a medical device, etc.

For example, an electronic device illustrated in FIG. 1 can include a device body 100, and the camera assembly described above can be arranged inside the device body 100.

In some embodiments, the electronic device, such as a smart phone, can further comprise a multimedia component including a screen providing an output interface between the electronic device and a user. In some embodiments, the screen can include a liquid crystal display (LCD) and a touch panel (TP). In some embodiments, the screen can include an OLED (organic light emitting diode) display, or other types of displays. The smart phone can further comprise a microphone, a speaker, etc.

If the screen includes the touch panel, the screen can be implemented as a touch screen to receive input signals from the user. The touch panel includes one or more touch sensors to sense touch, sliding and gestures on the touch panel. The touch sensor can not only sense the boundary of the touch or sliding operation, but also detect the duration and pressure associated with the touch or sliding operation.

Figure 2:
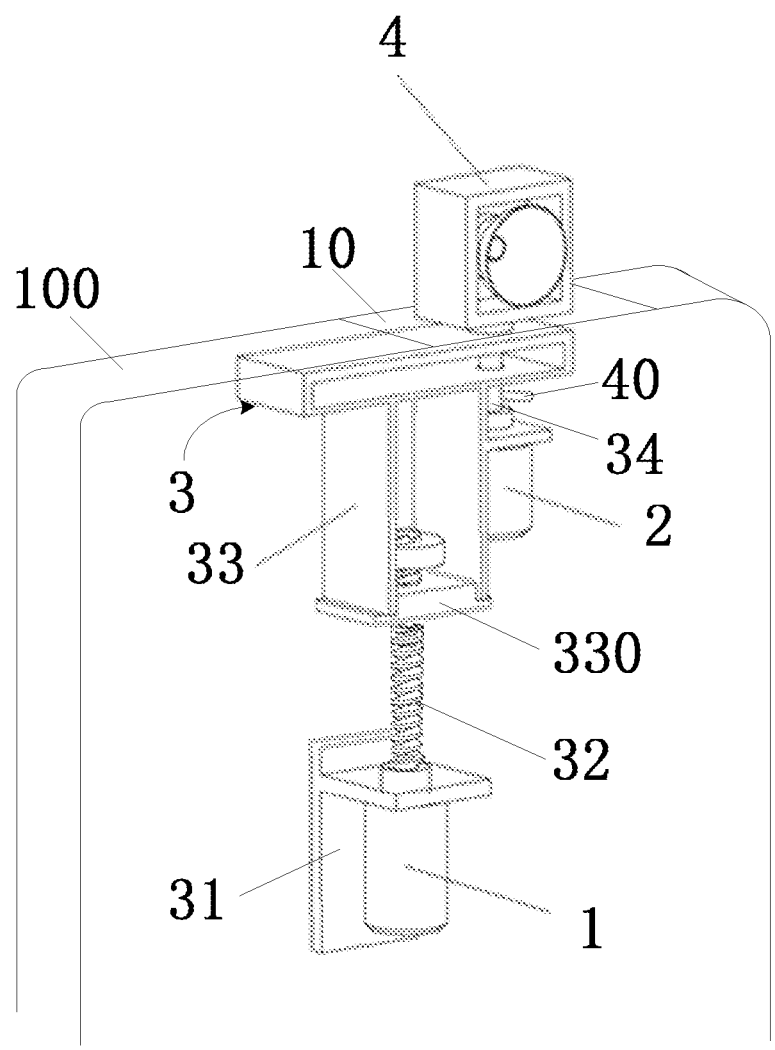
FIG. 2 is a schematic diagram of a camera assembly in an extended state according to some embodiments.

The camera module 4 is driven by the first driving structure 1 and the transmission 3, such that the camera module 4 can be switched between a retracted state illustrated in FIG. 1 and an extended state illustrated in FIG. 2. For example, when the electronic device does not start the image capturing function, the camera module 4 can be in the retracted state illustrated in FIG. 1. That is, the camera module 4 is located inside of the device body 100.

When the electronic device starts the image capturing function, the camera module 4 can be in the extended state illustrated in FIG. 2. That is, the camera module 4 is located outside of the device body 100, such that the electronic device can photograph or film by the camera module 4. Therefore, based on the camera assembly of the present disclosure, the camera module 4 can be arranged inside of the device body 100 to obtain relatively better waterproof and dust-proof performance, and when the electronic device drops, since the camera module 4 is arranged inside of the body or can be retracted back in time, the direct impact on the camera module 4 or its lens can be avoided and the camera module 4 can be prevented from damage or destroy.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

In some embodiments, as illustrated in FIGS. 1-2, the transmission 3 can include a fixed base 31, a screw rod 32, and a support 33. The support 33 includes a nut 330 fitted with the screw rod 32. The screw rod 32 has an end (such as a lower end in FIG. 1-2) fixedly connected to an output shaft (which is located at an upper end of the first driving structure 1 illustrated in FIG. 1-2) of the first driving structure 1, such that the rotational movement of the output shaft of the first driving structure 1 can be transferred to the screw rod 32, which drives the screw rod 32 to rotate about a vertical axis. Since the first driving structure 1 is fixed on a fixed base 31 and the fixed base 31 is further fixed on the device body 100, when the screw rod 32 rotates about the vertical axis, the nut 330 is fitted with the screw rod 32 through threads, and the rotational movement of the screw rod 32 can be transferred into the linear reciprocating movement of the nut 330 along the vertical direction.

Furthermore, because the nut 330 is fixedly connected to the support 33, the support 33 and the camera module 4 arranged on the support 33 both can move synchronously with the nut 330. Hence, the first driving structure 1 can drive the camera module 4 to reciprocate linearly in the vertical direction. For example, the first driving structure 1 can include an electric motor. When an output shaft of the electric motor rotates in a first direction (such as a clockwise direction), the camera module 4 can be driven to rise and protrude from the device body 100 (such as switching to the extended state illustrated in FIG. 2), and when the output shaft of the electric motor rotates in a second direction (such as a counterclockwise direction), the camera module 4 can be driven to go down and retract to the inside of the device body 100 (such as switching to the retracted state illustrated in FIG. 1).

In addition to the linear reciprocating movement, the transmission 3 can cooperate with the second driving structure 2 to drive the camera module 4 to rotate about an axis in the above preset direction (such as the vertical direction). For example, the axis can be an axis L illustrated in FIG. 3.

Figure 3:
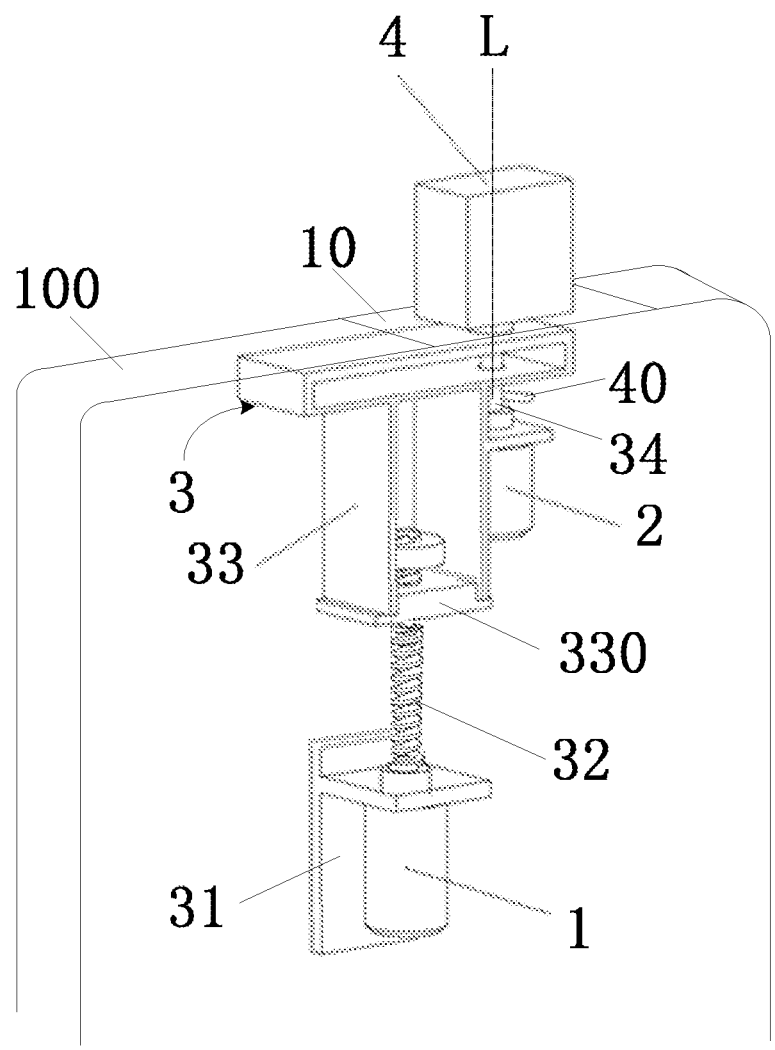
FIG. 3 is a schematic diagram of a camera assembly after rotation in an extended state, according to some embodiments.

In a case that FIG. 2-3 illustrate a rear panel surface of the device body 100, when the camera module 4 is in the extended state illustrated in FIG. 2, a lens faces a rear panel side, and the camera module 4 can be used as a rear camera.

When the camera module 4 rotates 180 degrees on the basis of the state illustration in FIG. 2 and switches to the extended state illustrated in FIG. 3, the lens faces a front panel side (so the lens cannot be seen in FIG. 3), and the camera module 4 can be used as a front camera. It is clear that the rotation of camera module 4 is realized by the cooperation between the second driving structure 2 and the transmission 3, enabling the camera module 4 to capture images from front and rear without arranging a front camera and a rear camera in the device body 100, which can reduce the occupancy in the internal space of the device body 100 and help to optimize the internal structure or reduce the volume of the device body 100.

By controlling a rotation direction and rotation angle of an output shaft of the second driving structure, a rotation direction and rotation angle of the camera module 4 can be controlled. In particular by controlling the rotation angle of the camera module 4, an additional image capturing effect can be achieved, which is not limited to switching between "front" and "rear". For example, by controlling the camera module 4 to rotate in a photographing process, a plurality of photos of different angles can be taken continuously. A wide-angle, ultra-wide-angle, and even 360-degree panoramic photo can be obtained by splicing these photos together.

In some embodiments, the second driving structure is fixed on the support 33. The transmission 3 further includes a transmission bar 34. The transmission bar 34 has a first end of (such as a lower end illustrated in FIGS. 1-3) fixedly connected with the output shaft of the second driving structure (which is located at an upper end of the second driving structure illustrated in FIGS. 1-3), and a second end (such as an upper end illustrated in FIGS. 1-3) connected with the camera module 4.

For example, the second driving structure can be an electric motor, and the rotational movement of an output shaft of the electric motor is transferred to the camera module 4 through a transmission bar 34, such that the camera module 4 rotates about the axis L. Since the second driving structure 2 is fixed on the support 33, the second driving structure can move together with the camera module 4 under the drive of the first driving structure 1, thus ensuring the relative position relationship among the transmission bar 34, the second driving structure 2 and the camera module 4.

In some embodiments, a transmission bar 34 can have a hollow tubular structure, and a side wall of the transmission bar 34 defines a through hole, such that a coaxial line 40 of the camera module 4 can be inserted into the transmission bar 34 through a top end thereof and then pass through the through hole in the side wall, thus avoiding additional occupancy in the internal space of the device body 100 and preventing interference between the coaxial line 40 and other lines, components or structures, achieving high reliability.

In the above-mentioned embodiments, the camera assembly only includes one camera module 4, such that the second driving structure 2 can directly drive the camera module 4 to rotate by the transmission bar 34. In other embodiments of the present disclosure, there can be a plurality of camera modules 4, and the transmission 3 can be improved to enable the second driving structure 2 to drive the plurality of camera modules 4 to rotate.

Figure 4:
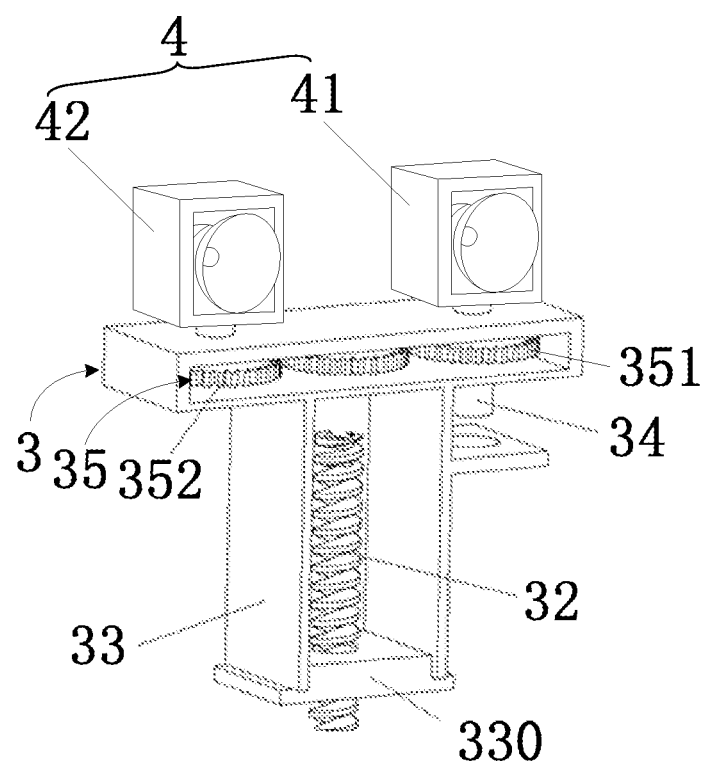
FIG. 4 is a schematic diagram of a camera assembly including a plurality of camera modules which are linked together according to some embodiments.

FIG. 4 is a schematic diagram of fitting between a transmission and a camera module according to some embodiments. As illustrated in FIG. 4, the transmission 3 can include a fixed base 31, a screw rod 32, a support 33 (including a nut 330), a transmission bar 34, and a gear set 35. The fitting among the fixed base 31, the screw rod 32, the support 33 and the nut 330 can refer to the embodiments illustrated in FIG. 1-3, which will not be repeated herein. The top of the support 33 is provided with a plurality of camera modules 4, such as a camera module 41 and a camera module 42.

The transmission bar 34 has a first end (such as a lower end in FIG. 4) fixedly connected with the output shaft of the second driving structure 2 (such as the upper end of the second driving structure 2 in FIG. 3), and a second end (such as an upper end in FIG. 4) engaged with an input gear in the gear set 35, and the rotational movement of the second driving structure 2 is transferred to the gear set 35 through the input gear. For example, the input gear can be the gear 351 illustrated in FIG. 4, and the gear set 35 includes several gear output shafts, such as an output shaft of the gear 351 and an output shaft of a gear 352. The output shaft of the gear 351 is connected with the camera module 41, and the output shaft of the gear 352 is connected with the camera module 42, thus driving the camera modules 41-42 to rotate about axes in the vertical direction.

The gear output shaft can be arranged at a center of a circle of the corresponding gear. For the gear 351, since both the gear output shaft and the transmission bar 34 are arranged at the center of a circle of the gear 351, actually the gear output shaft can be either an independent shaft separated from the transmission bar 34 or the transmission bar 34 passing through a through hole in the center of a circle of the gear 351, which is not limited by the present disclosure. The gear output shaft can have a hollow tubular structure, such that a coaxial line of the camera module 42 can extend from the inside of the output shaft of the gear 352, while a coaxial line of camera module 41 can extend from the inside of the gear 351 and the inside of the transmission bar 34 in sequence.

With the gear set 35, the second driving structure 2 can drive a plurality of camera modules 41-42 at the same time. With a gear set 35 of different structures, the relative movement between the camera modules 41-42 can be controlled. For example, the camera modules 41-42 can achieve forward synchronous movement, and that is, both rotation directions and rotation speeds are the same.

In some other examples, the camera modules 41-42 can achieve reverse synchronous movement, and that is, the rotation directions are opposite, and the rotation speeds are the same.

In some other examples, the camera modules 41-42 can achieve asynchronous movement, and that is, the rotation speeds are different, and the rotation directions are the same or different, such as by setting a gear ratio, the ratio of the rotation speed of the camera module 41 to the rotation speed of the camera module 42 satisfies a preset multiple.

Figure 5:
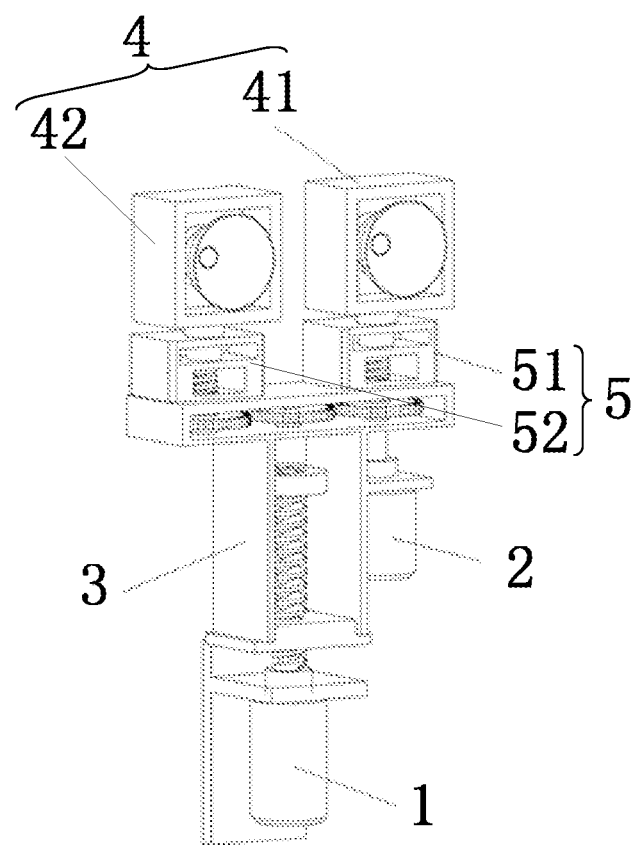
FIG. 5 is a schematic diagram of a camera assembly including a plurality of camera modules which are independently controlled according to some embodiments.

FIG. 5 is a schematic diagram of fitting between another transmission and the camera module according to some embodiments. As illustrated in FIG. 5, on the basis of the embodiment illustrated in FIG. 4, there is a relay 5 between each of the camera modules 4 and the corresponding output shaft of the gear, such as a relay 51 between the camera module 41 and the output shaft of the gear 351, and a relay 52 between the camera module 42 and the output shaft of the gear 352, to control whether an output torque of the transmission 3 obtained from the second driving structure 2 is transferred to the corresponding camera modules 4. If the relay 52 can transfer the output torque of the second driving structure 2 to one of the camera modules 4, then the one of the camera modules 4 can rotate. If the relay 52 prevents the output torque of the second driving structure 2 from transferring to the one of the camera modules 4, then the one of the camera modules 4 cannot rotate.

Figure 6:
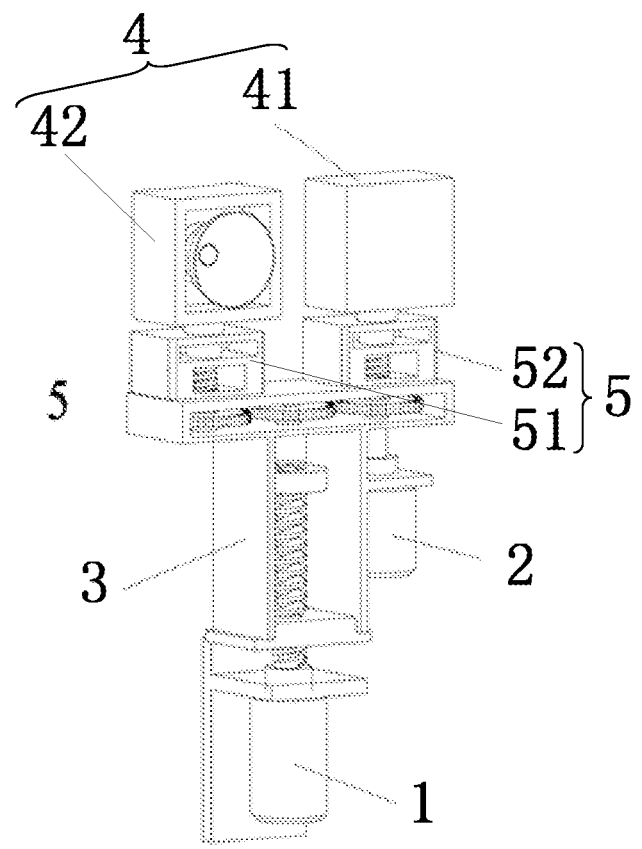
FIG. 6 is a schematic diagram of a camera module which is independently rotated according to some embodiments.

As such, by arranging the corresponding relay 5 for each of the camera modules 4, the rotation of each of the camera modules 4 can be independently controlled. For example, as illustrated in FIG. 6, by controlling the camera module 41 to rotate 180 degrees and the camera module 42 not to rotate, a lens of the camera module 41 faces the front panel side as a front camera, while a lens of the camera module 42 faces the rear panel side as a rear camera, which can realize the image capturing in the front direction and the rear direction at the same time, thus enriching image capturing scenes.

Figure 7:
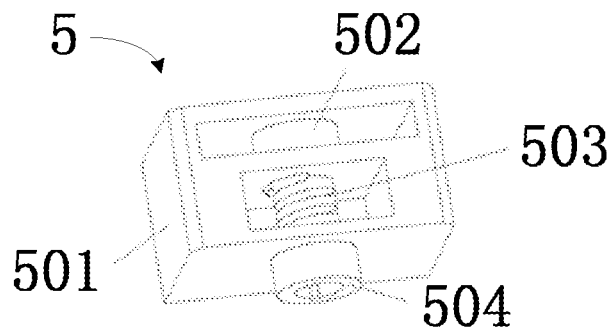
FIG. 7 is a schematic diagram of a relay according to some embodiments.

FIG. 7 is a schematic diagram of a relay according to some embodiments. As illustrated in FIG. 7, the relay 5 can include a housing 501, an electromagnet 502, a spring 503, and a sleeve 504, and the electromagnet 502, a spring 503 are arranged in the housing 501. The sleeve 504 is separably connected to the corresponding output shaft of the gear and cooperated with other structures of the relay 5 to realize the following operation.

Figure 8:
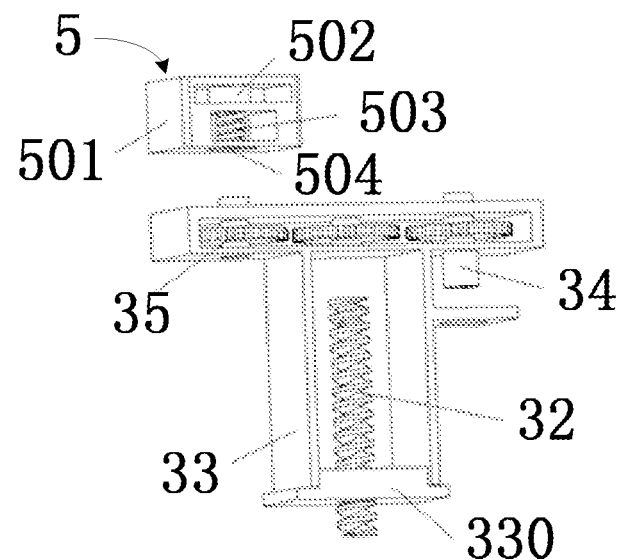
FIG. 8 is a schematic diagram of a relay in an energized state according to some embodiments.

As illustrated in FIG. 8, when the relay 5 is energized, the sleeve 504 can be attracted by the electromagnet 502 and the spring 503 retracts. The sleeve 504 is separated from the corresponding output shaft of the gear (for instance, the sleeve 504 can retract to the inside of the housing 501), such that the sleeve 504 is disconnected from the transmission 3, thereby terminating transmission of the output torque from the second driving structure 2 to the corresponding camera module 4.

Figure 9:
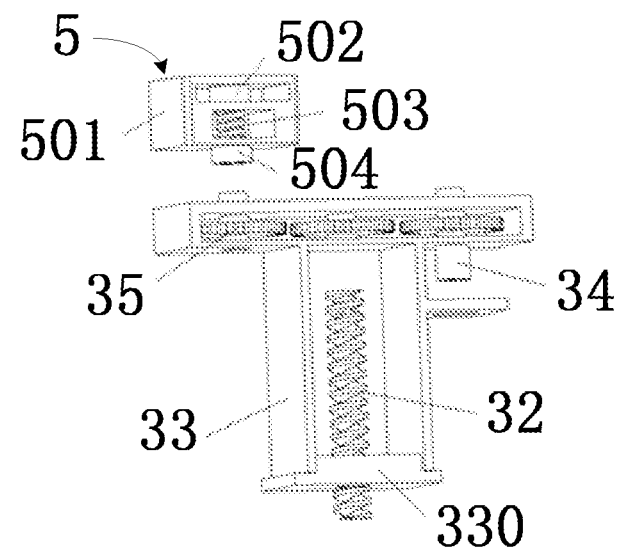
FIG. 9 is a schematic diagram of a relay in a de-energized state according to some embodiments.

As illustrated in FIG. 9, when the relay 5 is de-energized, the electromagnet 502 stops attracting the sleeve 501 and the sleeve 501 can be reset under an elastic force of the spring 503. The sleeve 504 is connected with the corresponding output shaft of the gear (for instance, the sleeve 504 can extend from the inside of the housing 501), such that the sleeve 504 cooperates with the transmission 3 again, to transfer the output torque of the second driving structure 2 to the corresponding camera module 4.

Therefore, by controlling the energized state and the de-energized state of the relays 51-52 corresponding to the camera modules 41-42, a rotation angle of the camera modules 41-42 can be independently controlled, and the camera modules 41-42 can achieve relatively more rotation angle combinations to meet the additional user needs and scene types.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A camera assembly, comprising:
a first driving structure;
a second driving structure;
a camera module;
a transmission capable of cooperating with the first driving structure to drive the camera module to reciprocate linearly in a preset direction, and capable of cooperating with the second driving structure to drive the camera module to rotate about an axis in the preset direction; and
a relay arranged between the camera module and the transmission to control whether an output torque of the transmission obtained from the second driving structure is transferred to the camera module,
wherein the relay comprises a housing, an electromagnet, a spring, and a sleeve, the electromagnet and the spring are arranged in the housing, when the relay is energized, the sleeve is attracted by the electromagnet, the sleeve is separated from the transmission to terminate transmission of the output torque from the second driving structure to the camera module; when the relay is de-energized, the sleeve is reset under an elastic force of the spring, the sleeve cooperates with the transmission again to transfer the output torque of the second driving structure to the camera module.

2. The camera assembly according to claim 1, wherein the transmission comprises:
a fixed base to which the first driving structure having an output shaft is fixed,
a support to which the camera module is fixedly coupled and comprising a nut; and
a screw rod fitted with the nut and connected with the output shaft to drive the camera module to reciprocate linearly in the preset direction through fitting between the screw rod and the nut.

3. The camera assembly according to claim 1, wherein the transmission further comprises a transmission bar having a first end fixedly connected with an output shaft of the second driving structure and a second end capable of driving the camera module to rotate about the axis in the preset direction.

4. The camera assembly according to claim 3, wherein a plurality of camera modules are provided, the transmission further comprises a gear set, an input gear of the gear set is engaged with the second end of the transmission bar, and a plurality of gear output shafts of the gear set are connected with camera modules respectively to drive the camera modules to rotate about axes in the preset direction respectively or simultaneously.

5. The camera assembly according to claim 3, wherein the transmission bar defines a through hole for a coaxial line of the camera module passing through.

6. The camera assembly according to claim 1, wherein the second driving structure is configured to move following the camera module reciprocating linearly.

7. The camera assembly according to claim 1, wherein each of the first driving structure and the second driving structure comprises an electric motor.

8. A camera assembly, comprising:
a transmission;
a camera module connected with the transmission;
a first driving structure connected to the transmission and drive the camera module to reciprocate linearly in a preset direction; and
a second driving structure connected to the transmission and drive the camera module to rotate about an axis in the preset direction,
wherein the transmission further comprises a transmission bar having a first end fixedly connected with an output shaft of the second driving structure and a second end driving the camera module to rotate about the axis in the preset direction,
wherein the camera module comprises a first camera module and a second camera module, the transmission further comprises a gear set, an input gear of the gear set is engaged with the second end of the transmission bar, and the gear set is provided with a first gear output shaft connected with the first camera module and a second gear output shaft connected with the second camera module to drive the first camera module and the second camera module to rotate about two axes in the preset direction individually or simultaneously,
wherein the camera assembly further comprises a first relay arranged between the first camera module and the transmission and a second relay arranged between the second camera module and the transmission, and
wherein each of the first relay and the second relay comprises a housing, an electromagnet, a spring, and a sleeve, the electromagnet and the spring are arranged in the housing, when each of the first relay and the second relay is energized, the sleeve is attracted by the electromagnet, the sleeve is separated from the transmission; when the relay is de-energized, the sleeve is cooperates with the transmission again.

9. The camera assembly according to claim 8, wherein the transmission comprises:
a fixed base to which the first driving structure having an output shaft is fixed;
a support to which the camera module is fixedly connected and comprising a nut; and
a screw rod fitted with the nut and connected with the output shaft to drive the camera module to reciprocate linearly in the preset direction through fitting between the screw rod and the nut.

10. The camera assembly according to claim 8, wherein the transmission bar defines a through hole, the camera module comprises a coaxial line inserted into the transmission bar and passing through the through hole.

11. The camera assembly according to claim 9, wherein the second driving structure is fixed on the support, when the camera module reciprocates linearly, the second driving structure moves together with the camera module.

12. The camera assembly according to claim 8, wherein each of the first driving structure and the second driving structure comprises an electric motor.

13. An electronic device, comprising:
a device body with an opening at any side of the device body; and
a camera assembly arranged in the device body, the camera module comprising:
a transmission,
a camera module connected with the transmission,
a first driving structure connected to the transmission and drive the camera module to protrude or retract through the opening in a preset direction,
a second driving structure connected to the transmission and drive the camera module to rotate about an axis in the preset direction after protruding through the opening, and
a relay arranged between the camera module and the transmission to control whether an output torque of the transmission obtained from the second driving structure is transferred to the camera module,
wherein the relay comprises a housing, an electromagnet, a spring, and a sleeve, the electromagnet and the spring are arranged in the housing, when the relay is energized, the sleeve is attracted by the electromagnet, the sleeve is separated from the transmission to terminate transmission of the output torque from the second driving structure to the camera module, when the relay is de-energized, the sleeve is reset under an elastic force of the spring, the sleeve cooperates with the transmission again to transfer the output torque of the second driving structure to the camera module.

14. The electronic device according to claim 13, wherein the transmission comprises a fixed base, a screw rod and a support, the support comprises a nut fitted with the screw rod, and the camera module is fixed on the support; the first driving structure is fixed on the fixed base, an output shaft of the first driving structure is connected with the screw rod to drive the camera module fixedly connected with the support to reciprocate linearly in the preset direction through fitting between the screw rod and the nut; the transmission further comprises a transmission bar, the transmission bar has a first end fixedly connected with an output shaft of the second driving structure and a second end driving the camera module to rotate about the axis in the preset direction.

15. The electronic device according to claim 14, wherein a plurality of camera modules are provided, the transmission further comprises a gear set, an input gear of the gear set is engaged with the second end of the transmission bar, and a plurality of gear output shafts of the gear set are connected with camera modules respectively to drive the camera modules to rotate about axes in the preset direction respectively or simultaneously.

16. The electronic device according to claim 14, wherein the transmission bar defines a through hole for a coaxial line of the camera module passing through.

17. The electronic device according to claim 13, wherein the second driving structure is configured to move following the camera module reciprocating linearly.

18. The electronic device according to claim 13, wherein each of the first driving structure and the second driving structure comprises an electric motor.

* * * * *